United States Patent
Watanabe (10) Patent No.: US 7,630,830 B2
(45) Date of Patent: Dec. 8, 2009

(54) NAVIGATION APPARATUS, DRIVING DIRECTION GUIDANCE METHOD, AND NAVIGATION SYSTEM

(75) Inventor: Hisayuki Watanabe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 8 days.

(21) Appl. No.: 11/225,869

(22) Filed: Sep. 13, 2005

(65) Prior Publication Data

US 2006/0058945 A1    Mar. 16, 2006

(30) Foreign Application Priority Data

Sep. 14, 2004    (JP) .............................. 2004-266838

(51) Int. Cl.
  *G01C 21/00* (2006.01)
  *G08G 1/123* (2006.01)

(52) U.S. Cl. .................. 701/200; 701/207; 701/208; 701/209; 701/210; 701/211; 701/212; 701/213; 701/214; 701/215; 340/988; 340/995.1; 340/995.14; 340/995.15; 340/995.16; 340/995.17; 340/995.18; 340/995.19; 340/995.24; 340/995.25; 340/995.26; 340/995.27; 340/995.28; 342/357.06; 342/357.08; 342/357.12; 342/357.13; 342/357.14

(58) Field of Classification Search .................. 701/200, 701/207–217; 340/988, 995.1, 995.14–995.19, 340/995.24–995.28; 342/357.06, 357.08, 342/357.12–357.14
See application file for complete search history.

(56) References Cited

U.S. PATENT DOCUMENTS

| | | | | |
|---|---|---|---|---|
| 5,938,718 A | * | 8/1999 | Morimoto et al. ........... | 701/201 |
| 5,978,733 A | * | 11/1999 | Deshimaru et al. ........... | 701/209 |
| 6,144,318 A | * | 11/2000 | Hayashi et al. ........ | 340/995.19 |
| 6,199,014 B1 | * | 3/2001 | Walker et al. ................ | 701/211 |
| 6,314,369 B1 | * | 11/2001 | Ito et al. ...................... | 701/209 |
| 6,453,235 B1 | * | 9/2002 | Endo et al. ................... | 701/211 |
| 6,498,983 B2 | * | 12/2002 | Hashida ...................... | 701/207 |
| 6,519,528 B2 | * | 2/2003 | Endo et al. ................... | 701/211 |
| 6,640,188 B2 | | 10/2003 | Hashida | |
| 6,826,472 B1 | * | 11/2004 | Kamei et al. ................ | 701/202 |
| 7,133,771 B1 | * | 11/2006 | Nesbitt ....................... | 701/202 |
| 2002/0049533 A1 | * | 4/2002 | Kusano et al. .............. | 701/209 |

FOREIGN PATENT DOCUMENTS

| | | | |
|---|---|---|---|
| JP | 9035177 | * | 2/1997 |
| JP | 09-035177 | | 7/1997 |
| JP | 2000310542 | * | 11/2000 |
| JP | 2003-279361 | | 2/2003 |
| JP | 2003057330 | * | 2/2003 |
| JP | 2003279361 | * | 10/2003 |

* cited by examiner

*Primary Examiner*—Jack W. Keith
*Assistant Examiner*—Chuong P Nguyen
(74) *Attorney, Agent, or Firm*—Brinks Hofer Gilson & Lione (57) ABSTRACT

A navigation apparatus and a driving direction guiding method are capable of clearly indicating a correct direction in which a vehicle should be driven at an exit when the vehicle exits a parking area through the exit. When a position measurement unit detects that the vehicle has entered a parking area based on measured position information, a CPU clearly indicates, on a display, a correct direction in which the vehicle should be driven at an exit of the parking area so that a user can know in advance the correct direction in which to drive his/her vehicle after passing through the exit of the parking area.

15 Claims, 9 Drawing Sheets

NAVIGATION APPARATUS, DRIVING DIRECTION GUIDANCE METHOD, AND NAVIGATION SYSTEM

FIELD OF THE INVENTION

The present invention relates to a navigation apparatus and a guiding method for guiding a current vehicle position and/or a driving direction.

DESCRIPTION OF THE RELATED ART

An in-vehicle navigation apparatus is known that acquires information indicating a current vehicle position by using a GPS (Global Positioning System) receiver or an in-vehicle sensor (such as a geomagnetic sensor, an acceleration sensor, or a gyroscopic sensor), reads map data of an area where the vehicle is currently located from a storage medium (such as a CD-ROM or a DVD-ROM), and displays the map on a display such that the current vehicle position is at the center of the displayed map.

The current vehicle position detected by the in-vehicle sensor has a cumulative error cumulated with running distance of the vehicle. The GPS receiver is capable acquiring information indicating the absolute position of the vehicle. Based on this absolute position, the cumulative error of the in-vehicle sensor is calibrated by so-called map matching.

If the vehicle enters an underground parking area or a multilevel parking facility, it becomes impossible for the navigation apparatus to receive GPS radio waves that are signals transmitted from GPS satellites. In such a situation, the navigation apparatus measures the current vehicle position using only the in-vehicle sensor.

However, in an area such as an underground parking area or a multilevel parking facility where map matching using a GPS is impossible, the cumulative error of the in-vehicle sensor increases. The cumulative error can make it impossible for the navigation apparatus to determine a correct direction in which the vehicle should be driven at an exit of an underground parking area or a multilevel parking facility.

When it becomes impossible for the GPS receiver to receive GPS radio waves, it is known to perform processing as follows (as disclosed, for example, in Japanese Unexamined Patent Application Publication No. 2003-279361). In a car navigation system disclosed in Japanese Unexamined Patent Application Publication No. 2003-279361, when it becomes impossible to receive GPS radio waves, position information indicating the location of an exit of a parking area is checked to determine whether the vehicle has entered the parking area. If the distance between the location of the exit of the parking area and the current vehicle position is within a predetermined value, it is determined that the vehicle has entered the parking area. When it becomes possible to again receive GPS radio waves, the position information indicating the exit of the parking area is checked. If the distance between the location of the exit of the parking area and the vehicle position is within a predetermined value, the vehicle position is calibrated to be equal to the location indicated by the position information of the exit.

However, in the technique disclosed in Japanese Unexamined Patent Application Publication No. 2003-279361, because the navigation system simply calibrates the vehicle position assuming that the vehicle is located at the exit of the parking area when it becomes possible to again receive GPS radio waves, it is impossible to indicate a correct direction in which the vehicle should be driven from the exit of the underground parking area or the multilevel parking facility.

It is also known to display an image indicating a driving direction such that the driving direction image is superimposed on a photographic image of a scene viewed ahead from a vehicle (as disclosed, for example, in Japanese Unexamined Patent Application Publication No. 9-35177).

However, in the technique disclosed in Japanese Unexamined Patent Application Publication No. 9-35177, it is impossible to indicate a direction in which the vehicle should be driven at an exit of a parking area, although it is possible to indicate a driving direction at intersections or the like on a navigation route.

SUMMARY OF THE INVENTION

In view of the above, it is an object of the present invention to provide a technique to clearly indicate a correct direction in which a vehicle should be driven at an exit of a parking area when the vehicle is going to leave the parking area.

To achieve the above-described object, the present invention provides a navigation apparatus capable of determining whether a vehicle is in a parking area based on map data including position information indicating a vehicle position, and, if it is determined that the vehicle is in a parking area, indicating a direction in which the vehicle should be driven at an exit of the parking area.

More specifically, the present invention provides a navigation apparatus including a position measurement unit for measuring the current position of a vehicle, a map data storage unit for storing map data including position information indicating the location of a parking area, an information presentation unit for indicating a direction in which the vehicle should be driven at an exit of the parking area, and a controller that, when the current position measured by the position measurement unit is identical to the location of the parking area, determines that the vehicle is in the parking area and presents, via the information presentation unit, information about a direction in which the vehicle should be driven, with a predetermined timing.

The present invention also provides a navigation apparatus including a position measurement unit for measuring the current position of a vehicle, a map data storage unit for storing map data including position information indicating the location of a parking area, a driving direction image generator for producing an image indicating the direction in which the vehicle should be driven, an image storage unit for storing a scene image seen outwardly from an exit of the parking area, an image mixer for mixing the image indicating the driving direction produced by the driving direction image generator with the scene image read from the image storage unit, a display for displaying the mixed image produced by the image mixer, and a controller that, when the current position measured by the position measurement unit is identical to the location of the parking area, determines that the vehicle is in the parking area and displays the mixed image produced by the image mixer on the display with a predetermined timing.

The present invention also provides a navigation apparatus including a position measurement unit for measuring the current position of a vehicle, a map data storage unit for storing map data including position information indicating the location of a parking area, a driving direction image generator for producing an image indicating the direction in which the vehicle should be driven, a transmission/reception unit for transmitting position information of the parking area and acquiring a scene image seen from an exit of the parking area identified by the position information, an image mixer for mixing the image indicating the driving direction produced by the driving direction image generator with the scene image acquired via the transmission/reception unit, a display for displaying the mixed image produced by the image mixer, and a controller that, when the current position measured by the position measurement unit is identical to the location of the parking area, determines that the vehicle is in the parking area and displays the mixed image produced by the image mixer on the display with a predetermined timing.

The present invention also provides a driving direction guiding method including a first step in which the current position of a vehicle is measured by a position measurement unit, a second step in which a determination is made as to whether the current vehicle position detected in the first step is in a parking area, and a third step in which if it is determined in the second step that the current vehicle position is in a parking area, a direction in which the vehicle should be driven at an exit of the parking area is indicated.

The present invention also provides a driving direction guiding method including a first step in which the current position of a vehicle is measured by a position measurement unit, a second step in which a determination is made as to whether the position measurement unit can receive GPS radio waves, a third step in which a determination is made as to whether the current vehicle position detected in the first step is in a parking area, and a fourth step in which if it is determined in the second step that the position measurement unit cannot receive GPS radio waves, and if it is also determined in the third step that the current vehicle position is in a parking area, a direction in which the vehicle should be driven at an exit of the parking area is indicated.

The present invention also provides a navigation system including a parking area exit image storage unit for storing a scene image seen outwardly from an exit of a parking area, a parking area exit image providing apparatus including a parking area exit image transmitter for transmitting the scene image stored in the parking area exit image storage unit, a position measurement unit for measuring the current position of a vehicle, a map data storage unit for storing map data including position information indicating the location of a parking area, a driving direction image generator for producing an image indicating the direction in which the vehicle should be driven, a receiver for acquiring the scene image seen outwardly from the exit of the parking area transmitted from the parking area exit image transmitter, an image mixer for mixing the image indicating the driving direction produced by the driving direction image generator with the scene image acquired via the receiving unit, a display for displaying the mixed image produced by the image mixer, and a controller that, when the current position measured by the position measurement unit is identical to the location of the parking area, determines that the vehicle is in the parking area and displays the mixed image produced by the image mixer on the display with a predetermined timing.

According to the present invention, it is possible to present a user with information clearly indicating a correct direction in which the vehicle should be driven at an exit of a parking area when the vehicle is going to leave the parking area, and thus the user can know in advance the direction to drive the vehicle at the exit, that is, the user can comfortably and correctly drive his/her vehicle at the exit of the parking area without getting lost at the exit and after leaving the exit.

DESCRIPTION OF THE PREFERRED EMBODIMENTS

First Embodiment

Figure 1:
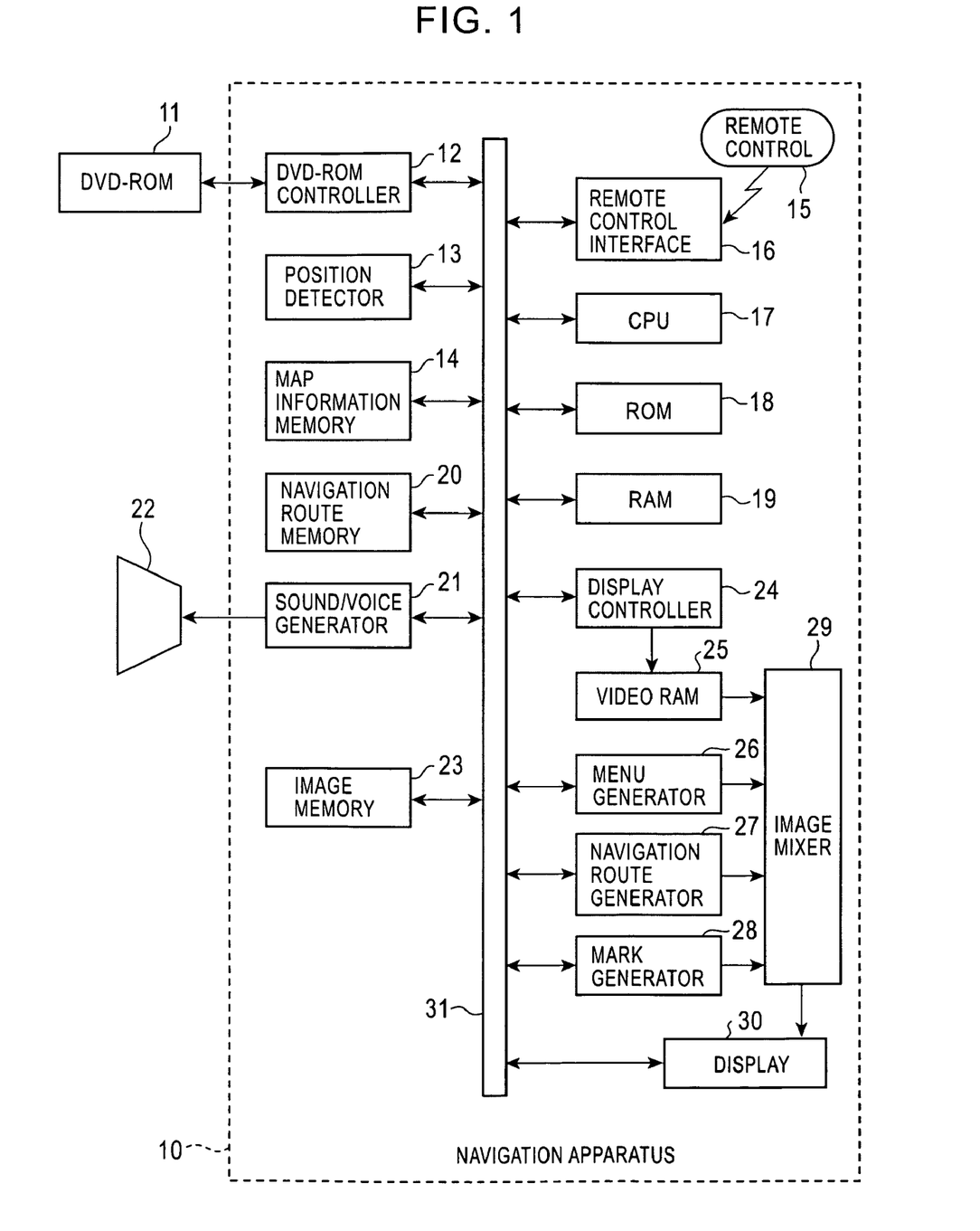
FIG. 1 is a block diagram showing an example of a construction of a navigation apparatus according to a first embodiment.

A first embodiment of the present invention is described below with reference to the accompanying drawings. FIG. 1 is a block diagram showing an example of a construction of a navigation apparatus 10 according to a first embodiment. In FIG. 1, reference numeral 11 denotes a map storage medium such as a DVD-ROM on which various map data necessary in displaying a map or in searching for a navigation route are stored. Although in the present embodiment, the DVD-ROM 11 is used as the storage medium for storing map data, other types of storage media such as a CD-ROM or a hard disk may be used. A DVD-ROM controller 12 controls the operation of reading map data from the DVD-ROM 11.

The map data stored on the DVD-ROM 11 includes data associated with buildings and facilities on the map (that is, data indicating positions, addresses, phone numbers, genres, etc.), road unit data necessary in various processes such as map matching or route searching, and intersection unit data representing details of intersections. The map data includes data indicating genres of facilities located on the map. The genre data distinguishably identifies outdoor parking areas and indoor parking areas enclosed by a roof or the like (such as multilevel parking facilities or underground parking areas).

The road unit includes information associated with nodes corresponding to points such as an intersection or a junction point at which a plurality of roads cross each other, and links corresponding roads between each two adjacent nodes. The detailed information associated with each link is stored in a link record, in terms of, for example, a link length, a link cost, a road attribute flag, a road type flag, etc.

The link length represents the actual length of the road corresponding to the link. The link cost represents the time in units of, for example, minutes needed to run along the link, calculated based on the road type or the legal speed. The road attribute flags represent the various attributes of the link. The road type flag represents the type, such as an expressway or a general road, of the actual road corresponding to the link.

Reference numeral 13 denotes a position measurement unit that detects the current position and the direction of the vehicle. The position measurement unit 13 includes a self-contained navigation sensor, a GPS receiver, a position calculation CPU, and a position information memory. The self-contained navigation sensor includes a vehicle speed sensor (distance sensor) that outputs one pulse per predetermined running distance thereby detecting the running distance of the vehicle, and an angular velocity sensor (relative direction sensor) such as a vibrating gyroscope that detects the turning angle (moving direction) of the vehicle. The self-contained navigation sensor detects the relative position and direction of the vehicle using the vehicle speed sensor and the angular velocity sensor.

The position calculation CPU calculates the (estimated) absolute position and direction of the vehicle based on the data indicating the relative position and direction of the vehicle, which is output from the self-contained navigation sensor. The position information memory stores the absolute position and direction of the vehicle. The position information memory is realized using a nonvolatile memory or the like so that the content stored therein is not lost, even after an engine is shut off. The GPS receiver receives GPS radio waves transmitted from a plurality of GPS satellites via a GPS antenna, and calculates the absolute position and direction of the vehicle by the 3- or 2-dimensional position measurement (the direction of the vehicle is calculated based on the current position of the vehicle and the position at a time one sampling period ΔT before the current time). The GPS receiver notifies a CPU 17, which will be described later, of the receiving condition of the GPS radio waves.

A map information memory 14 temporarily stores map data read from the DVD-ROM 11 under the control of the DVD-ROM controller 12. More specifically, the DVD-ROM controller 12 inputs the information indicating the current position of the vehicle from the position measurement unit 13 and outputs a command to read map data of a particular area including the current position of the vehicle thereby reading map data needed to display a map or search for a navigation route from the DVD-ROM 11 and storing the map data in the map information memory 14. The map information memory 14 is a unit embodying a map data storage unit described in the claims of the present invention.

A remote control 15 includes operation elements (buttons or a joystick) used by a user to input information to set the navigation apparatus 10 in terms of various conditions (such as a destination or a via-point of a navigation route) or used to issue various kinds of operation command (such as a menu selection command, an enlargement/reduction command, a manual map scroll command, a character input command, etc.). A remote control interface 16 receives a signal that is output from the remote control 15 in accordance with an operation performed on the remote control 15.

The processor (CPU) 17 is a unit embodying a controller described in the claims of the present invention, and the CPU 17 is responsible for the control over the entire navigation apparatus 10. A ROM 18 stores various programs (a driving direction guiding program, a navigation route search program, etc.). A RAM 19 temporarily stores data obtained in the middle or at the end of various processes. According to the navigation route search program stored in the ROM 18, the CPU 17 searches for a navigation route that is least in cost from the current position to a destination, using the map data stored in the map information memory 14. The details of the process performed by the CPU 17 according to the driving direction guiding program will be described later.

A navigation route memory 20 stores data of a navigation route detected in the searching performed by the CPU 17. The navigation route data includes data indicating locations of nodes on the route from the current position to a destination and also includes intersection identification flags each indicating whether a corresponding node is an intersection. The navigation route memory 20 is a unit embodying a navigation route storage unit described in the claims of the present invention.

A voice/sound generator 21 generates a voice/sound for providing guidance information on the direction in which to drive the vehicle or on other operations of the vehicle. A speaker 22 outputs the voice/sound generated by the voice/sound generator 21 to the outside.

An image storage unit 23 stores image data of a scene of an exit of a parking area where GPS radio waves cannot be received, along with position information indicating the position of the exit of the parking area. Examples of parking areas where GPS radio waves cannot be received are underground parking areas, multilevel parking facilities, and other parking areas that are enclosed by a roof or the like. The scene image data is image data representing a scene viewed outwardly from the exit of the parking area where GPS radio waves cannot be received. The scene image data may be image data produced by taking a photographic image of an actual scene or may be image data produced by a 2- or 3-dimensional computer graphics technique.

A display controller 24 produces map image data necessary to display a map on a display 30, which will be described later, based on map data stored in the map information memory 14. The display controller 24 reads the scene image data stored in the image storage unit 23.

A video RAM 25 temporarily stores the map image data produced by the display controller 24 or the scene image data read from the image storage unit 23. More specifically, the map image data produced by the display controller 24 is temporarily stored in the video RAM 25, and one screen of map image data is read from the video RAM 25 and supplied to an image mixer 29 which will be described later. The scene image data read by the display controller 24 is temporarily stored in the video RAM 25 and then output to the image mixer 29, which will be described later.

A menu generator 26 generates a menu image used in operations on the remote control 15 and outputs the generated menu image. A navigation route generator 27 generates navigation route data according to the result obtained via the process performed according to the navigation route search program and stored in the navigation route memory 20. More specifically, the navigation route generator 27 selectively reads a part of a navigation route, included in the current map area written in the video RAM 25, of the result obtained via the process performed according to the navigation route search program and stored in the navigation route memory 20, and the navigation route generator 27 writes the navigation route such that the navigation route is highlighted in color and such that the navigation route is superimposed on the map image.

A mark generator 28 (which is a unit embodying a driving direction image generator described in the claims of the present invention) generates and outputs a vehicle mark used to indicate the position of the vehicle, various landmarks such as a parking area, a service station and a convenience store, and an image (for example, an arrow mark) displayed on the scene image to indicate the direction in which to drive the vehicle.

The image mixer 29 mixes the images and outputs the result. More specifically, the image mixer 29 superimposes image data output from the menu generator 26, the navigation route generator 27, and the mark generator 28 upon the map image data read by the display controller 24, and outputs the resultant image data to the display 30. Thus, a map of an area in which the vehicle is located is displayed together with the vehicle mark on the screen of the display 30. The display 30 is a unit embodying a display and an information presentation unit described in the claims of the present invention.

The image mixer 29 also produces a mixed image by superimposing image data (such as an arrow mark) output from the mark generator 28 on the scene image data read by the display controller 24, and outputs the resultant image data to the display 30. As a result, an image of a scene seen from an exit of a parking area, such as an underground parking area or a multilevel parking facility where GPS radio waves cannot be received, is displayed on the screen of the display 30 together with other image data, such as an arrow mark indicating the direction in which the vehicle should be driven.

A bus 31 is used for transmission of data among the functional units described above.

The process performed by the CPU 17 according to the driving direction guiding program stored in the ROM 18 is described in detail below. The CPU 17 determines whether GPS radio waves are being received, based on the receiving condition of the GPS radio waves informed by the GPS receiver of the position measurement unit 13. If no GPS radio waves are received, the CPU 17 determines whether the vehicle is in a parking area. More specifically, the CPU 17 determines whether the vehicle is in a parking area by checking the current vehicle position detected by the position measurement unit 13 based on the map data stored in the map information memory 14.

If the position measurement unit 13 cannot detect GPS radio waves and if the CPU 17 determines that the vehicle is in a parking area, the CPU 17 controls the display controller 24 so as to extract, from the image storage unit 23, image data of a scene of an exit of the parking area based on the position information indicating the position of the parking area. The extracted scene image data is supplied to the image mixer 29.

The CPU 17 reads data of the navigation route from the navigation route memory 20, and determines the direction in which the vehicle should be driven from the exit of the parking area, based on the data of the navigation route. In a case in which the parking area where the vehicle is located is on the navigation route, the direction in which the vehicle should be driven from the exit of the parking area is determined based on the navigation route to the destination. On the other hand, in a case in which the parking area is located at the destination, and a new destination from the parking area is set, the direction in which the vehicle should be driven at the exit of the parking area is determined based on a navigation route to the new destination. The CPU 17 then controls the mark generator 28 to generate image data (such as an arrow mark) indicating the direction in which the vehicle should be driven at the exit of the parking area.

Figure 2A:
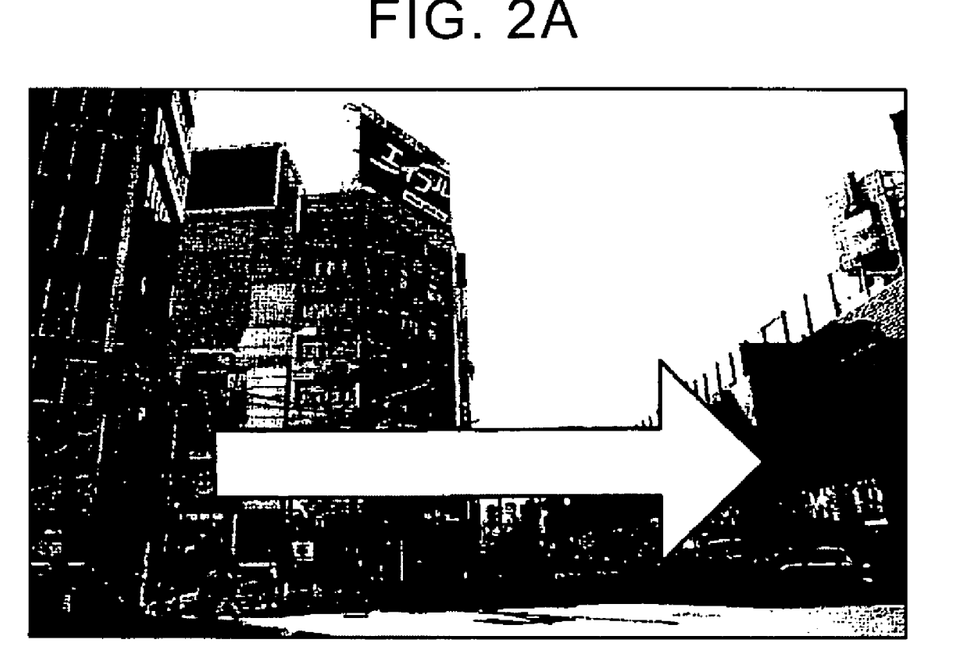
FIGS. 2A and 2B are diagrams showing examples of display screens of a navigation apparatus according to the first embodiment or a second embodiment.
Figure 2B:
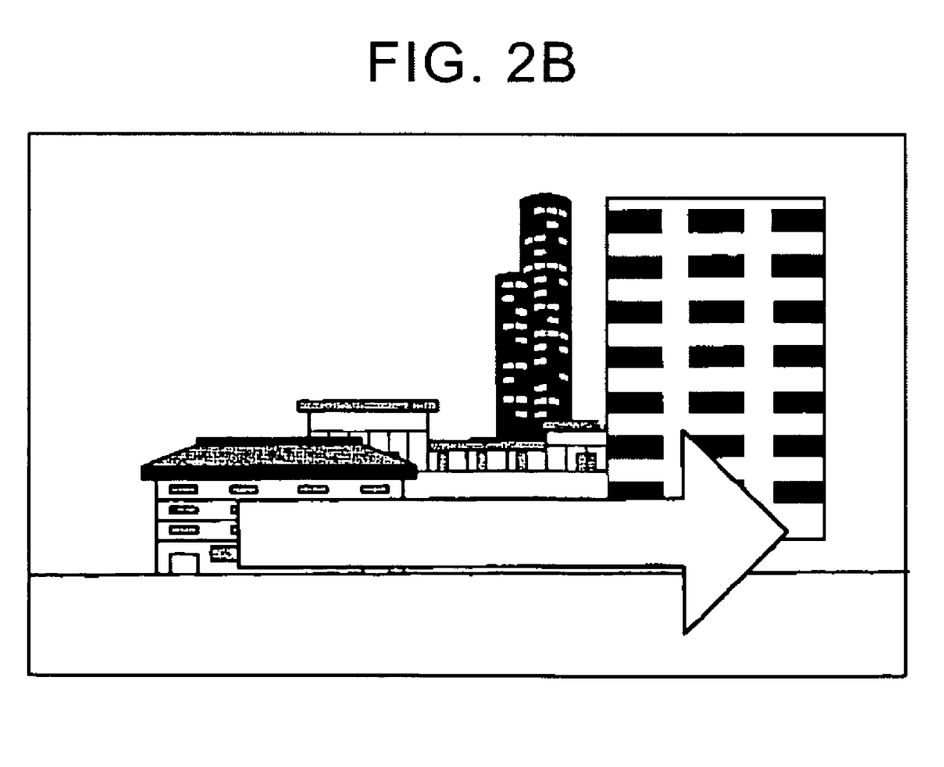

The scene image data extracted from the image memory 23 and the image data indicating the driving direction generated by the mark generator 28 are mixed by the image mixer 29 and displayed on the display 30. The process of mixing and displaying the scene image data and the image data indicating the driving direction is performed in accordance with predetermined timing. Herein, the predetermined timing refers to a time when the vehicle enters the parking area, that is, when it becomes impossible to receive GPS radio waves and thus the CPU 17 determines that the vehicle has entered the parking area. A driving direction guiding image such as that shown in FIG. 2A or 2B is displayed on the display 30. Herein, the driving direction guiding image refers to an image produced by superimposing the image indicating the driving direction on the image of the scene viewed from the exit of the parking area.

FIGS. 2A and 2B show examples of screens on which a driving direction guiding image is displayed on the display 30 by the navigation apparatus 10 in accordance with the first embodiment. More specifically, for example, as shown in FIG. 2A, a driving direction guiding image is produced by the image mixer 29 by superimposing an arrow indicating a driving direction on a photographic image of an actual scene. Alternatively, as shown in FIG. 2B, the driving direction guiding image may be in a form in which an arrow indicating the driving direction is superimposed on a simple image of a scene.

Figure 3:
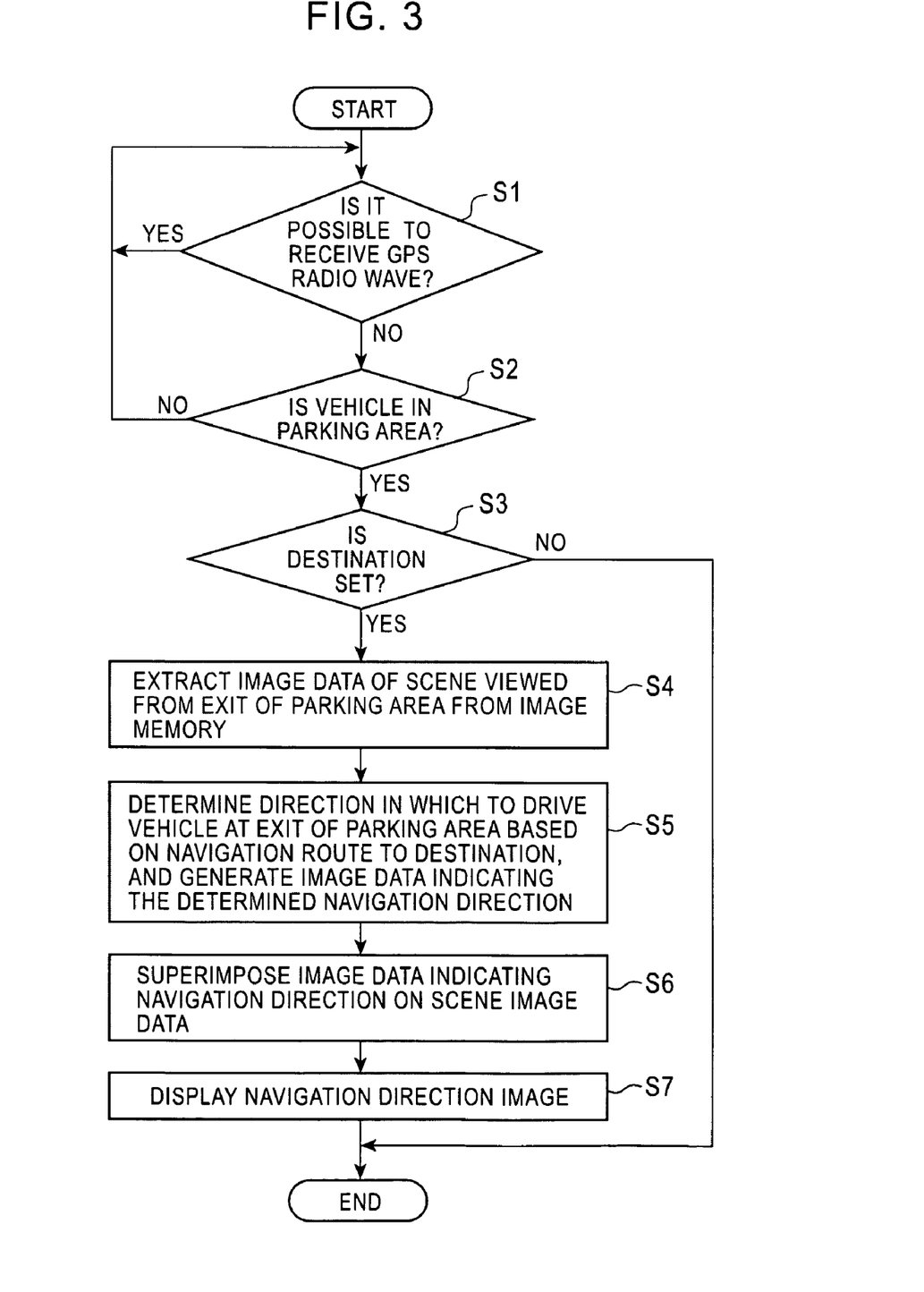
FIG. 3 is a flow chart showing an operation of a navigation apparatus and a driving direction guiding method according to the first embodiment.

The operation of the navigation apparatus 10 and the driving direction guiding method according to the first embodiment are described below. FIG. 3 is a flow chart showing the operation of the navigation apparatus 10 and the driving direction guiding method according to the first embodiment. First, as shown in FIG. 3, the CPU 17 determines whether the position measurement unit 13 can receive GPS radio waves (step S1). If the position measurement unit 13 can receive GPS radio waves (that is, if the answer to step S1 is YES), the process in step S1 is repeated.

On the other hand, if the CPU 17 determines that the position measurement unit 13 cannot receive GPS radio waves (that is, if the answer to step S1 is NO), the CPU 17 determines whether the vehicle is in a parking area, by comparing the current vehicle position detected by the position measurement unit 13 with the map data stored in the map information memory 14 (step S2). In a case in which the CPU 17 determines that the vehicle is not in a parking area (that is, if the answer to step S2 is NO), the process returns to step S1.

If the CPU 17 determines that the vehicle is in a parking area (that is, if the answer to step S2 is YES), the CPU 17 checks the navigation route memory 20 to determine whether the destination is set (step S3). If the CPU 17 determines that no destination is set (that is, if the answer to step S3 is NO), the process is ended.

On the other hand, if the CPU 17 determines that the destination is set (that is, if the answer to step S3 is YES), the CPU 17 extracts the scene image data seen outwardly from the exit of the parking area from the image storage unit 23, and outputs it to the display controller 24 (step S4). The display controller 24 outputs the scene image data to the image mixer 29 via the video RAM 25.

The CPU 17 determines the direction in which the vehicle should be driven at the exit of the parking area, based on the navigation route to the destination extracted from the navigation route memory 20. The mark generator 28 generates image data indicating the determined driving direction and supplies the generated image data to the image mixer 29 (step S5). The image mixer 29 mixes the image data indicating the driving direction determined in step S5 with the scene image data extracted in step S4, thereby producing driving direction guiding image data (step S6).

The image mixer 29 displays the driving direction guiding image data produced in step S6 on the display 30 (step S7).

In the first embodiment, as described in detail above, when a vehicle is in a parking area where GPS radio waves cannot be received, an image indicating a driving direction is superimposed on an image of a scene viewed from an exit of the parking area, and the resultant image is displayed on the display 30. This makes it possible to present a user with information clearly indicating a direction in which the vehicle should be driven at the exit of the parking area even when the vehicle cannot receive GPS radio waves in the parking area. Thus, the user can know, in advance, the correct direction in which to drive the vehicle after passing through the exit. This makes it possible for the user to comfortably and correctly drive his/her vehicle at the exit of the parking area without getting lost.

Second Embodiment

Figure 4:
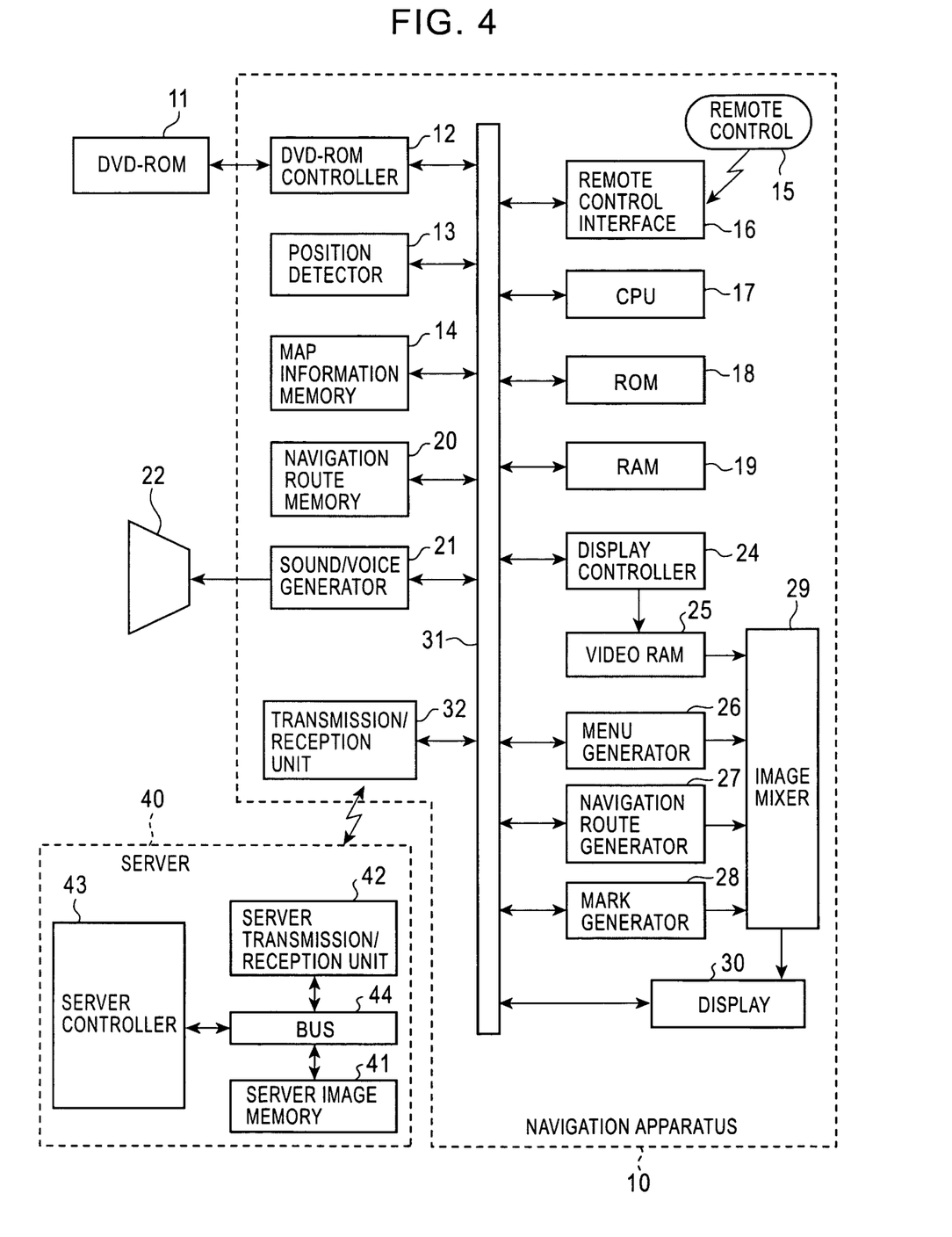
FIG. 4 is a block diagram showing an example of a construction of a navigation apparatus according to the second embodiment.

A second embodiment of the present invention is described below with reference to the accompanying drawings. FIG. 4 is a block diagram showing an example of a construction of a navigation apparatus 10 according to the second embodiment. As shown in FIG. 4, the navigation apparatus 10 according to the second embodiment includes, instead of the image memory 23, a transmission/reception unit 32 that transmits and receives data to or from an external server 40.

The server 40 disposed outside the navigation apparatus 10 includes a server image memory 41 that stores image data of a scene viewed outwardly from an exit of a parking area together with associated position information. The server 40 also includes a server transmission/reception unit 42 that transmits and receives data to or from the transmission/reception unit 32 of the navigation apparatus 10. The server 40 further includes a server controller 43 that controls the server image memory 41 and the server transmission/reception unit 42. The server 40 also includes a bus 44 via which component units transmit and receive data to or from one another. The server 40 serves as a center apparatus that stores scene image data in the server image memory 41 and provides image data of a scene viewed from an exit of a parking area.

A process performed by the CPU 17 according to a driving direction guiding program stored in the ROM 18 is described in detail below. The CPU 17 determines whether GPS radio waves are being received, based on the GPS radio wave receiving condition informed by the GPS receiver of the position measurement unit 13. If it is determined that GPS radio waves are not being received, the CPU 17 further determines whether the vehicle is in a parking area. More specifically, the CPU 17 determines whether the vehicle is in a parking area by referring to the map data stored in the map information memory 14, based on the current vehicle position detected by the position measurement unit 13.

If it is determined that the vehicle is in a parking area, the CPU 17 transmits position information indicating the location of the parking area to the server 40 via the transmission/reception unit 32. If the server transmission/reception unit 42 of the server 40 receives the position information indicating the location of the parking area from the transmission/reception unit 32 of the navigation apparatus 10, the server controller 43 extracts image data of a scene viewed from the exit of the parking area from the server image memory 41, based on the position information indicating the location of the parking area received via the server transmission/reception unit 42. The server controller 43 transmits the extracted scene image data to the transmission/reception unit 32 of the navigation apparatus 10 from the server transmission/reception unit 42. The transmission/reception unit 32 of the navigation apparatus 10 receives the scene image data transmitted from the server transmission/reception unit 42.

The display controller 24 temporarily stores the scene image data received via the transmission/reception unit 32 in the video RAM 25. The image mixer 29 produces a mixed image by superimposing the image data (such as an arrow mark) output from the mark generator 28 on the scene image data stored, by the display controller 24, in the video RAM 25. The resultant image data is output to the display 30. Thus, on the screen of the display 30, the scene image viewed from the exit of the parking area, such as an underground parking area or a multilevel parking facility where GPS radio waves cannot be received, is displayed together with the image, such as an arrow mark indicating the direction in which the vehicle should be driven.

Figure 5:
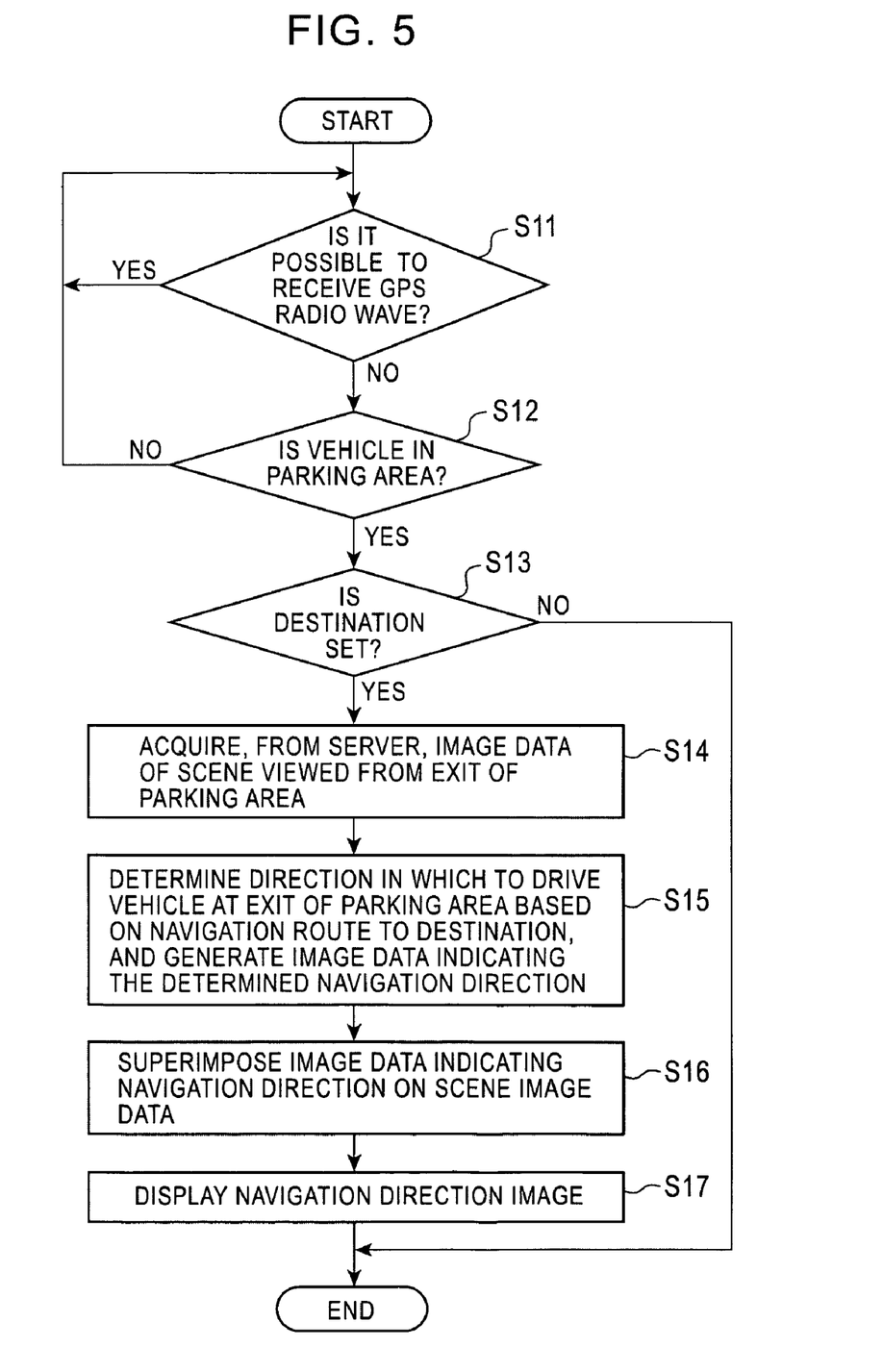
FIG. 5 is a flow chart showing an operation of a navigation apparatus and a driving direction guiding method according to the second embodiment.

The operation of the navigation apparatus 10 and the driving direction guiding method according to the second embodiment are described below. FIG. 5 is a flow chart showing the operation of the navigation apparatus 10 and the driving direction guiding method according to the second embodiment. As shown in FIG. 5, first, the CPU 17 determines whether the position measurement unit 13 can receive GPS radio waves (step S11). If the position measurement unit 13 can receive GPS radio waves (that is, if the answer to step S11 is YES), the process in step S11 is repeated.

On the other hand, if the CPU 17 determines that the position measurement unit 13 cannot receive GPS radio waves (that is, if the answer to step S11 is NO), the CPU 17 determines whether the vehicle is in a parking area, by comparing the current vehicle position detected by the position measurement unit 13 with the map data stored in the map information memory 14 (step S12). In a case in which the CPU 17 determines that the vehicle is not in a parking area (that is, if the answer to step S12 is NO), the process returns to step S11.

On the other hand, in a case in which the CPU 17 determines that the vehicle is in a parking area (that is, if the answer to step S12 is YES), the CPU 17 checks the navigation route memory 20 to determine whether the destination is set (step S13). If the CPU 17 determines that no destination is set (that is, if the answer to step S13 is NO), the process is ended.

On the other hand, in a case in which the CPU 17 determines that the destination is set (that is, if the answer to step S13 is YES), the CPU 17 extracts image data of a scene viewed from the exit of the parking area from the server image memory 41 of the server 40 via the transmission/reception unit 32, and supplies the extracted scene image data to the display controller 24 (step S14).

The CPU 17 determines the direction in which the vehicle should be driven at the exit of the parking area, based on the navigation route to the destination extracted from the navigation route memory 20. The mark generator 28 generates image data indicating the determined driving direction and supplies the generated image data to the image mixer 29 (step S15). The image mixer 29 produces driving direction guiding image data by superimposing the image data indicating the driving direction obtained in step S15 on the scene image data extracted in step S14 (step S16).

The image mixer 29 displays the driving direction guiding image data obtained in step S1 on the display 30 (step S17).

In the second embodiment, as described in detail above, the scene image data is acquired from the external server 40, and thus the second embodiment has, in addition to the advantages obtained in the first embodiment, an additional advantage that the high-capacity image memory 23 for storing scene image data is not necessary. This makes it possible to reduce the size and the cost of the navigation apparatus 10. Furthermore, because the scene image data is stored in the server image memory 41 of the server 40, it is possible to handle a newly constructed parking area simply by updating the server image memory 41.

Although in the first and second embodiments described above, a driving direction guiding image is displayed when the vehicle is in a parking area (such as a multilevel parking facility or an underground parking area) where GPS radio waves cannot be received, a driving direction guiding image may also be displayed in other situations. For example, when the vehicle is parked in a parking area that is not enclosed by a roof or the like, if the vehicle is driven back and forth or driving direction is changed many times before the vehicle is parked at a final position of the parking area, there is a possibility that it becomes impossible to correctly determine a direction in which the vehicle should be driven at an exit of the parking area. In such a situation in which the vehicle is in a parking area that is not enclosed by a roof or the like, a driving direction guiding image may also be displayed according to the embodiment of the invention. In other words, a driving direction guiding image may be displayed when the vehicle is in a parking area of any type. This makes it possible for a user to know, in advance, a correct direction in which to drive the vehicle after passing through the exit, that is, the user can comfortably and correctly drive his/her vehicle at the exit of the parking area without getting lost.

Although in the first and second embodiments described above, a driving direction guiding image is produced and displayed on the display 30 when the vehicle enters a parking area, a driving direction guiding image may also be displayed in other situations. For example, a driving direction guiding image may be displayed when the engine of vehicle and the power of the navigation apparatus 10 are turned on again (to leave the parking area) after the engine of the vehicle and the power of the navigation apparatus 10 are turned off.

More specifically, the position information indicating the position of the vehicle at a time immediately before the engine is shut off is stored in the position information memory (not shown) of the position measurement unit 13. When the engine and the power of the navigation apparatus 10 are turned on again, the CPU 17 reads the position information from the position information memory and acquires scene image data from the image memory 23 or the server image memory 41 according to the position information. A driving direction guiding image is then produced using the acquired scene image data and displayed on the display 30.

Figure 6:
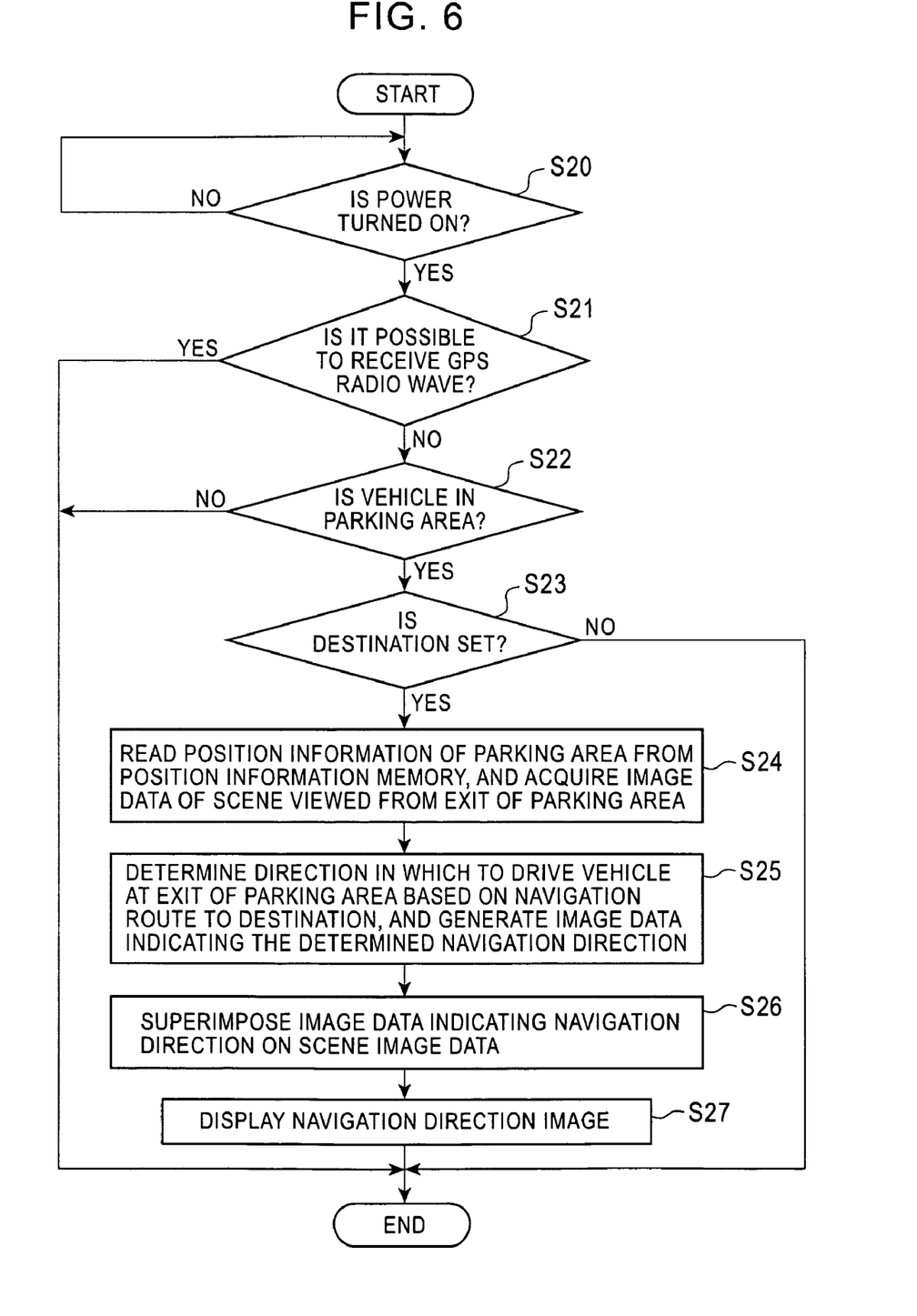
FIG. 6 is a flow chart showing a modification of the operation of the navigation apparatus and a modification of the driving direction guiding method according to the first or second embodiment.

FIG. 6 is a flow chart showing the operation of the navigation apparatus and the driving direction guiding method according to the present embodiment. First, as shown in FIG. 6, the CPU 17 determines whether the power of the navigation apparatus 10 is turned on (step S20). If the power is not yet turned on, the step S20 is performed repeatedly until the power is turned on.

On the other hand, if it is determined that the power in turned on, the CPU 17 further determines whether the position measurement unit 13 can receive GPS radio waves (step S21). If the position measurement unit 13 can receive GPS radio waves (that is, if the answer to step S21 is YES), the process is ended.

On the other hand, if the CPU 17 determines that the position measurement unit 13 cannot receive GPS radio waves (that is, if the answer to step S21 is NO), the CPU 17 compares the position information stored in the position information memory of the position measurement unit 13 with the map data stored in the map information memory 14 to determine whether the vehicle is in a parking area (step S22). If the CPU 17 determines that the vehicle is not in a parking area (that is, if the answer to step S22 is NO), the process is ended.

On the other hand, in a case in which the CPU 17 determines that the vehicle is in a parking area (that is, if the answer to step S22 is YES), the CPU 17 checks the navigation route memory 20 to determine whether the destination is set (step S23). If the CPU 17 determines that no destination is set (that is, if the answer to step S23 is NO), the process is ended.

On the other hand, in a case in which the CPU 17 determines that the destination is set (that is, if the answer to step S23 is YES), the CPU 17 extracts, from the image storage unit 23, image data of a scene viewed outwardly from the exit of the parking area at the location indicated by the position information read from the position information memory, and the CPU 17 supplies the extracted scene image data to the display controller 24 (step S24).

The CPU 17 determines the direction in which the vehicle should be driven at the exit of the parking area, based on the navigation route to the destination extracted from the navigation route memory 20. The mark generator 28 generates image data indicating the determined driving direction and supplies the generated image data to the image mixer 29 (step S25). The image mixer 29 produces driving direction guiding image by superimposing the image data indicating the driving direction obtained in step S25 with the scene image data extracted in step S24 (step S26).

The image mixer 29 displays the driving direction guiding image data produced in step S26 on the display 30 (step S27).

Figure 7:
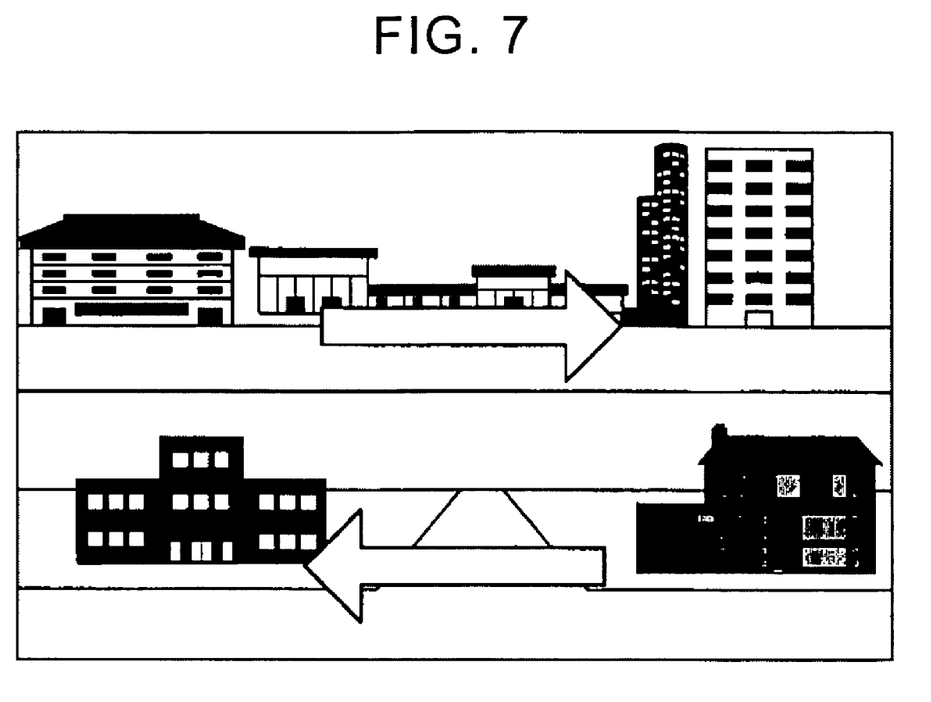
FIG. 7 is a diagram showing an example of a modification of the display screen of the navigation apparatus according to the first or second embodiment.

In the first and second embodiments described above, it is assumed that the parking area has only one exit. However, the present invention may also be applied when the parking area has two or more exits. For example, when a parking area has two exits, driving direction guiding images for respective exits may be displayed in parallel, as shown in FIG. 7. More specifically, the image mixer 29 produces a plurality of mixed images (driving direction guiding images) by superimposing driving direction guiding image data generated by the mark generator 28 on the scene image data corresponding to the respective exits. In this way, it is possible to provide driving direction guiding information when there are two or more exits.

When a parking area has two or more exits, an exit that is least in cost from the exit to a destination may be detected, and a driving direction guiding image may be displayed only for the detected exit, or the driving direction guiding image of the least-cost exit may be displayed in a highlighted fashion together with driving direction guiding images of the other exits displayed in a normal fashion. More specifically, the cost is calculated for each of navigation routes from the respective exits to the destination, and a navigation route having a least cost is selected. The image mixer 29 produces a plurality of mixed images (driving direction guiding images) by superimposing driving direction guiding image data produced by the mark generator 28 on the scene image data corresponding to the respective exits. The resultant mixed images are displayed such that a driving direction guiding image on an image of a scene viewed from an exit corresponding to the selected least-cost navigation route is highlighted.

When costs are calculated, weighting may be performed such that a greater weight is given to turning to left than turning to right at an exit of a parking area (in the case of left-hand traffic). More specifically, weights for link costs for roads connected to the respective exits are determined depending on the driving direction at each exit. By calculating the costs in the above-described manner and displaying a driving direction guiding image determined according to the calculated costs, it is possible to present a user with information clearly indicating a correct exit via which the vehicle should leave the parking area when the parking area has two or more exits.

Figure 8:
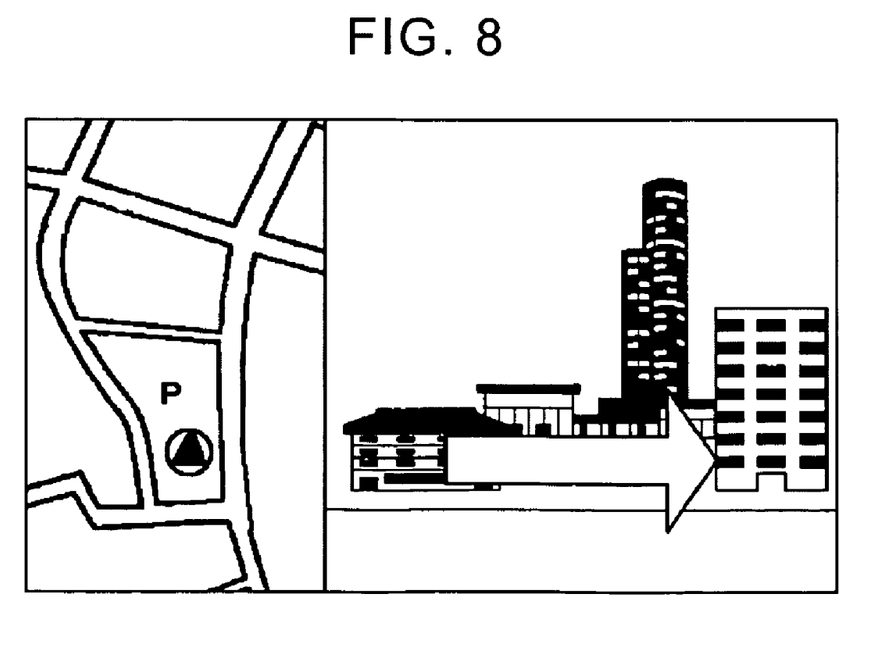
FIG. 8 is a diagram showing a second example of a modification of the display screen of the navigation apparatus according to the first or second embodiment.
Figure 9:
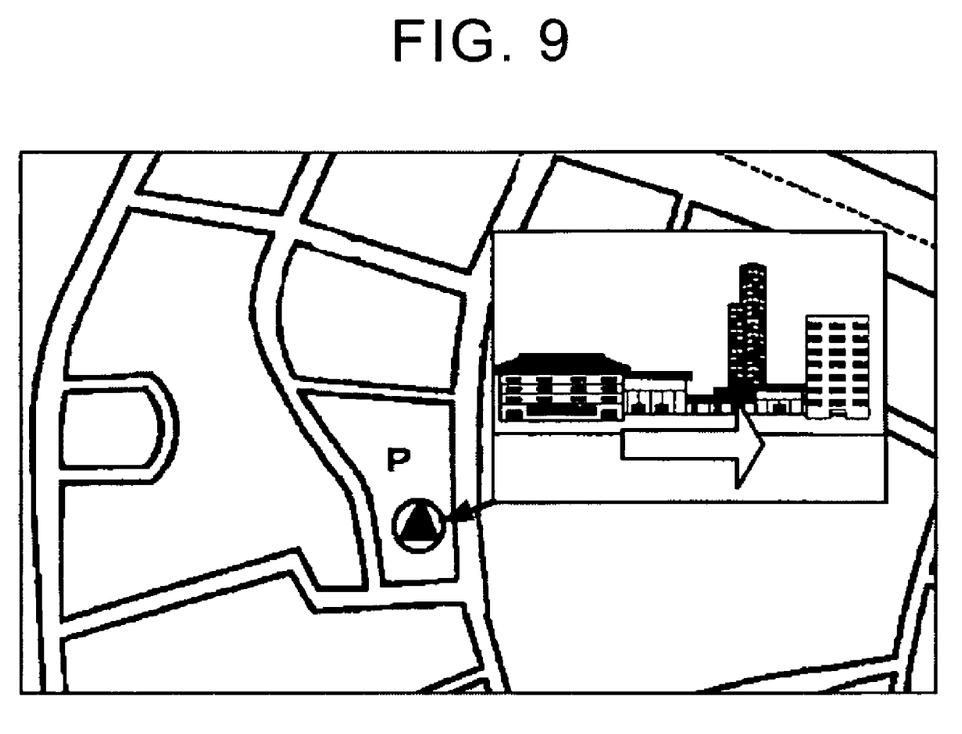
FIG. 9 is a diagram showing a third example of a modification of the display screen of the navigation apparatus according to the first or second embodiment.

Although in the first and second embodiments described above, only the driving direction guiding image is displayed on the display 30, other additional information may also be displayed. For example, as shown in FIG. 8, the screen of the display 30 may be divided into two parts, and a map of an area where the vehicle is located is displayed in one part and the image indicating the driving direction at the exit of the parking area may be displayed in the other part. This allows a user to get information about the direction in which the vehicle should be driven at the exit of the parking area, while viewing the map of the area where the vehicle is located, and thus the user can get detailed information about the route along which to drive the vehicle after passing through the exit. Thus, the user can comfortably and correctly drive his/her vehicle at the exit of the parking area without getting lost at the exit and after leaving the exit. The driving direction guiding image may be displayed in a small sub-window, as shown in FIG. 9. This allows the map to be displayed in a great area so that a user can get more detailed information about a route along which the vehicle should be driven after leaving the exit.

Although in the first and second embodiments described above, information about the driving direction is presented to a user by displaying it on the display 30, information about the driving direction may be presented in different manners. For example, when there is only one exit in a parking area where GPS radio waves cannot be received, only the driving direction may be displayed on the display 30, or a voice indicating the driving direction may be generated by the sound/voice generator 21 and output from the speaker 22. In this case, the speaker 22 serves as a unit embodying an information presentation unit described in the claims of the present invention.

Figure 10:
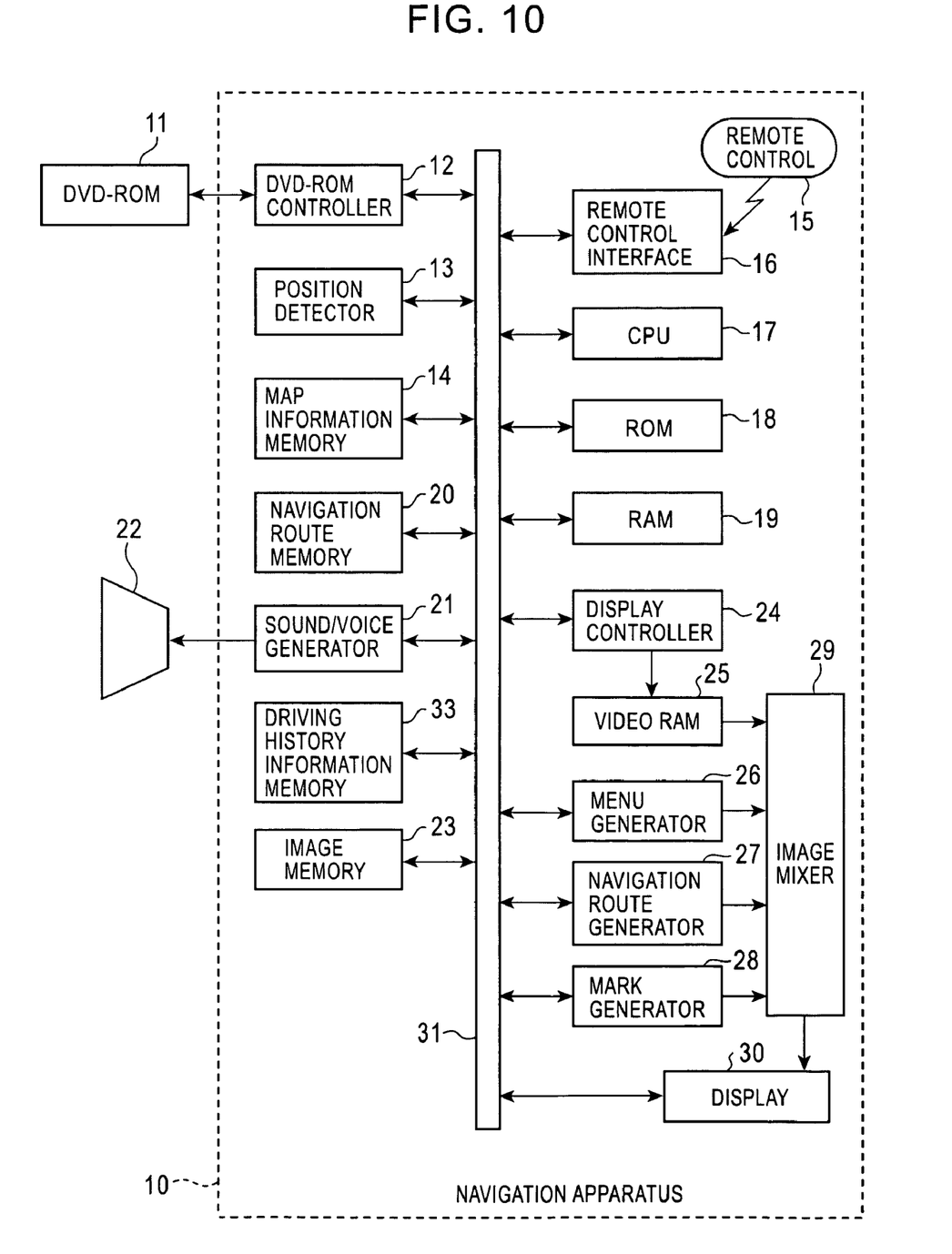
FIG. 10 is a block diagram showing an example of a modification of the navigation apparatus according to the first embodiment.

Although in the first and second embodiments described above, when a destination is set, a driving direction is determined from navigation route data and an image indicating the driving direction is displayed, a driving direction may be displayed when no destination is specified. For example, when no destination is specified, a driving direction may be guided such that the vehicle will go back along a route along which the vehicle has reached the parking area. More specifically, for example, as shown in FIG. 10, the navigation apparatus 10 may include a driving history information memory 33 for storing a driving history of the vehicle. When no destination is specified, the CPU 17 reads the driving history from the driving history information memory 33, and determines the driving direction such that the vehicle will travel along a route described in the driving history.

Although in the second embodiment described above, scene image data associated with exits of parking areas are stored in the single server 40 and provided to the navigation apparatus 10, the scene image data may be stored in different manners. For example, a server 40 may be disposed at a parking area and only scene image data associated with that parking area may be stored in a server image memory 41 of that server 40. In this case, because the server 40 is located close to the navigation apparatus 10, the navigation apparatus 10 can receive the scene image data at a high speed in a highly-reliable manner.

The present invention has been described above in detail with reference to the first and second embodiments by way of example but not limitation. Note that the present invention is not limited to these specific embodiments, but various modifications are possible without departing from the spirit and scope of the invention.

What is claimed is:

1. A navigation apparatus comprising:
   a position measurement unit configured to determine the current position of a vehicle;
   a map storage unit configured to store map data including position information indicating the location of an indoor parking area, the indoor parking area being enclosed by a roof;
   a driving direction image generator configured to produce an image indicating the direction in which the vehicle should be driven upon exiting the indoor parking area to place the vehicle along a route from the indoor parking area to a destination other than the indoor parking area;
   an image storage unit configured to store a scene image of the exit of the indoor parking area as viewed ahead from the vehicle when the vehicle is inside of the indoor parking area and as the vehicle is about to exit the indoor parking area;
   an image mixer configured to combine the image indicating the driving direction with the scene image to produce a composite image that comprises, while the vehicle is inside of the indoor parking area, the direction in which the vehicle should be driven upon exiting the indoor parking area superimposed on the scene image such that the direction in which to drive the vehicle after passing through the exit to place the vehicle on the route from the indoor parking area to the destination can be ascertained in advance of driving through the exit;
   a display screen configured to display the composite image; and
   a controller configured to determine whether global positioning system (GPS) radio waves cannot be received based on information sent from a GPS receiver, and when the controller determines that GPS radio waves cannot be received, the controller is further configured to determine whether (1) the current position of the vehicle corresponds to a location within the indoor parking area and (2) the destination has been selected, and direct that the display screen display the composite image when the controller determines that the current position corresponds to the location within the indoor parking area and the destination is selected.

2. A navigation apparatus according to claim 1, wherein:
   the controller is configured to determine that the vehicle is within the indoor parking area when the navigation apparatus is turned on.

3. A navigation apparatus according to claim 1, wherein the image mixer is configured to produce a composite image for each of a plurality of exits of the indoor parking area by combining an image that indicates a driving direction with a corresponding scene image for each of the plurality of exits.

4. A navigation apparatus according to claim 1, wherein the controller is configured to calculate the cost for a navigation route from each of a plurality of exits of the indoor parking area to the destination, and select the navigation route having a least cost.

5. A navigation apparatus according to claim 4, wherein the image mixer is configured to read a scene image of the exit corresponding to the navigation route selected by the controller and combine the image indicating the driving direction with the scene image.

6. A navigation apparatus according to claim 4, wherein the controller is configured to change a link cost of a road connected to each exit depending upon a driving direction at each exit.

7. A navigation apparatus comprising:
   a position measurement unit configured to determine the current position of a vehicle;

a map storage unit configured to store map data including position information indicating the location of an indoor parking area, the indoor parking area being enclosed by a roof;

a driving direction image generator configured to produce an image indicating the direction in which the vehicle should be driven upon exiting the indoor parking area to place the vehicle along a navigation route from an exit of the indoor parking area to a destination that is a location other than the indoor parking area;

an image mixer configured to combine the image indicating the driving direction with a scene image of the exit of the indoor parking area as viewed ahead from the vehicle as the vehicle is about to exit the indoor parking area and outwardly from the indoor parking area to produce a composite image that comprises, while the vehicle is inside of the indoor parking area, the direction in which the vehicle should be driven upon exiting the indoor parking area superimposed on the scene image such that the direction in which to drive the vehicle after passing through the exit to place the vehicle on the route from the indoor parking area to the destination can be ascertained in advance of driving through the exit;

a display screen configured to display the composite image; and a controller configured to determine whether global positioning system (GPS) radio waves are being received, and when the controller determines that GPS radio waves are not being received, the controller further being configured to determine (1) whether the current position of the vehicle is within the indoor parking area and (2) if the destination has been set, and direct the display screen to present the composite image when the controller determines that the current position is within the indoor parking area and the destination is set.

8. A navigation apparatus according to claim 7, the apparatus comprising a receiver configured to acquire the scene image of the exit of the parking area transmitted from an external transmitter.

9. A navigation apparatus according to claim 7, wherein:
the controller is configured to determine that the vehicle is within the indoor parking area when the navigation apparatus is turned on.

10. A navigation apparatus according to claim 7, wherein the image mixer is configured to produce a composite image for each of a plurality of exits of the indoor parking area by combining an image that indicates a driving direction with a corresponding scene image for each of the plurality of exits.

11. A navigation apparatus according to claim 7, wherein the controller is configured to calculate the cost for a navigation route from each of a plurality of exits of the indoor parking area to the destination, and select the navigation route having a least cost.

12. A navigation apparatus according to claim 7, wherein the controller is configured to change a link cost of a road connected to each exit depending upon a driving direction at each exit.

13. A navigation apparatus according to claim 7, comprising a driving history storage unit configured to store a driving history associated with traveling to a destination, wherein the controller is configured to determine the direction in which the vehicle should be driven at the exit of the parking area based upon the driving history.

14. A navigation apparatus according to claim 1, comprising a driving history storage unit configured to store a driving history associated with traveling to a destination, wherein the controller is configured to determine the direction in which the vehicle should be driven at the exit of the parking area based upon the driving history.

15. A navigation apparatus according to claim 1, the apparatus comprising a receiver configured to acquire the scene image of the exit of the parking area transmitted from an external transmitter.

* * * * *